United States Patent

[11] 3,570,810

| [72] | Inventor | Raymond P. Kawolics<br>Marysville, Ohio |
|---|---|---|
| [21] | Appl. No. | 795,628 |
| [22] | Filed | Jan. 31, 1969 |
| [45] | Patented | Mar. 16, 1971 |
| [73] | Assignee | Wallace-Murray Corporation<br>Pittsburgh, Pa. |

[54] FAUCET VALVE
3 Claims, 5 Drawing Figs.

[52] U.S. Cl. .................................................. 251/172,
251/192, 251/316, 251/367
[51] Int. Cl. ........................................................ F16k 25/02
[50] Field of Search ........................................... 137/454.2,
454.5, 454.6; 251/367, 360, 316, 368, 172

[56] References Cited
UNITED STATES PATENTS
| 557,395 | 3/1896 | Kelley et al. ................... | 251/316X |
| 2,825,529 | 3/1958 | Albrecht ...................... | 251/360X |
| 3,006,361 | 10/1961 | Reinemann ................... | 137/454.5 |
| 3,173,444 | 3/1965 | Bucknell ...................... | 137/454.6 |
| 3,384,121 | 5/1968 | Spencer....................... | 137/454.2 |
| 3,425,660 | 2/1969 | Holycross..................... | 251/172 |

*Primary Examiner*—Harold W. Weakley
*Attorney*—Birch, Swindler, McKie & Beckett ABSTRACT: A faucet valve of the nonrise-type wherein the valve seat and the valve closure member are made of a wear- and corrosion-resistant material, such as a high alumina ceramic. The mating faces of the valve seat and the valve closure member are highly polished so that when the faucet valve is in the closed position, the valve seat and the valve closure member are held together in sealing relationship by the inlet liquid pressure. The sealing elements are held together in a valve housing as a module which can be inserted and removed from the faucet body as a unit.

PATENTED MAR 16 1971    3,570,810

OPEN

CLOSED

INVENTOR
RAYMOND P. KAWOLICS

BY
Jrons, Birch, Swindler & McKie
ATTORNEYS

3,570,810

FAUCET VALVE

BACKGROUND OF THE INVENTION

In the patent application entitled "FAUCET VALVE," Ser. No. 573,031 filed on Aug. 17, 1966, now U.S. Pat. No. 3,425,660 issued on Feb. 4, 1969 to Frank R. Holycross, Jr., the valve utilizes three highly polished ceramic members to effect the necessary sealing within the housing of the valve. The instant invention represents an improvement over that design in that one of the ceramic sealing members has been eliminated.

In the past, there were occasions where the valve seat would slip out of its housing and drop into the body of the faucet. This occurred particularly if there were a failure of water pressure on the hot or cold line, but not the other, thereby placing pressure on the valve seat from the upstream side, without the compensating pressure from the downstream side.

An additional problem occuring in brass valves in the past is that t the valve stem sometimes would bind with its supporting bushing. This resulted from the electrolytic action between the members, commonly known as "dezincification."

Accordingly, it is the primary object of this invention to provide a simplified valve structure which eliminates the aforementioned problems occurring in valves in the past.

SUMMARY

Generally speaking, the invention comprises a faucet valve which includes a valve body having a liquid inlet and outlet. A housing is mounted inside the body having at least one opening in the wall thereof through which liquid can flow into the outlet. A valve seat having a central passageway communicating with the liquid inlet is loosely mounted in the bottom inlet end of the housing. A valve closure member is rotatably mounted on the valve seat and is movable from a first position wherein the passageway is totally closed to a second position wherein the passageway has a maximum opening which communicates with the housing opening. The valve seat and the valve closure member have smoothly polished mating surfaces so that liquid pressure acting on the inlet side of the valve seat is sufficient alone to provide a seal therebetween when the valve is in the closed position. Facilities are provided so that the valve closure member can be manually moved between its first and second positions. An annular retainer having a generally L-shaped cross section has an upper portion which fits within the housing to hold the valve seat therein, while the bottom portion of the retainer supports the housing.

In the preferred embodiment, the housing has an upper portion made of plastic to act as a bushing for the valve stem. Also, an O-ring is mounted on the valve stem for providing a seal between the downstream side of the valve closure member and the housing.

DRAWINGS

The invention will now be more fully described in conjunction with an operative embodiment thereof shown in the accompanying drawings wherein.

DESCRIPTION OF THE INVENTION

Figure 1:
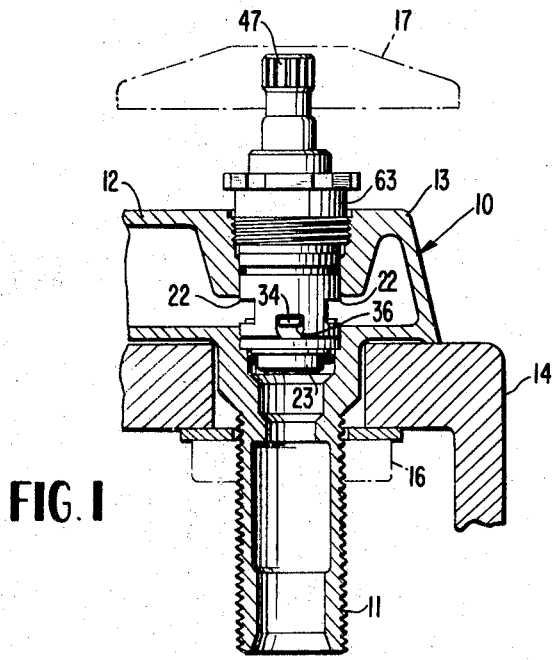
FIG. 1 is an axial section taken through a faucet incorporating the invention, with part of the valve shown in elevation.

In FIG. 1 there is shown a faucet designated generally 10 which includes a liquid inlet 11 and a portion of an outlet spout shown as element 12. The faucet 10 includes a valve body 13 which is secured in the opening of a support 14 by a nut 16, and is regulated by a handle 17, the nut 16 and the handle 17 being shown in phantom.

Figure 2:
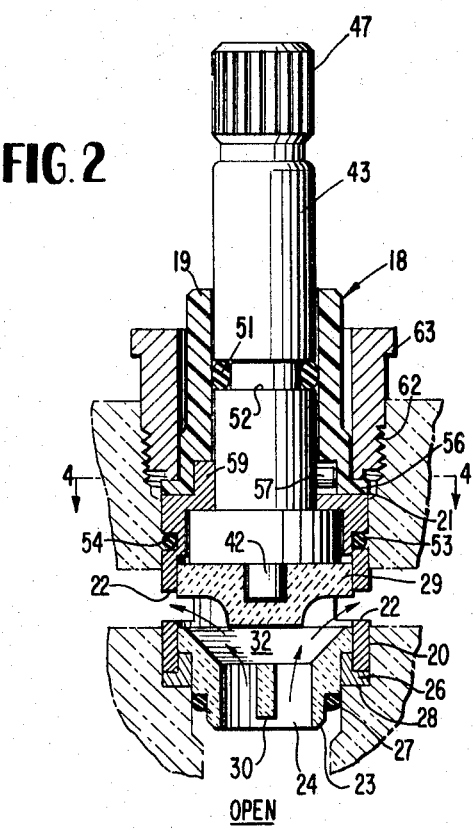
FIG. 2 is an enlarged view of the valve of FIG. 1 shown in cross section with portions removed and with the valve in the OPEN position.
Figure 3:
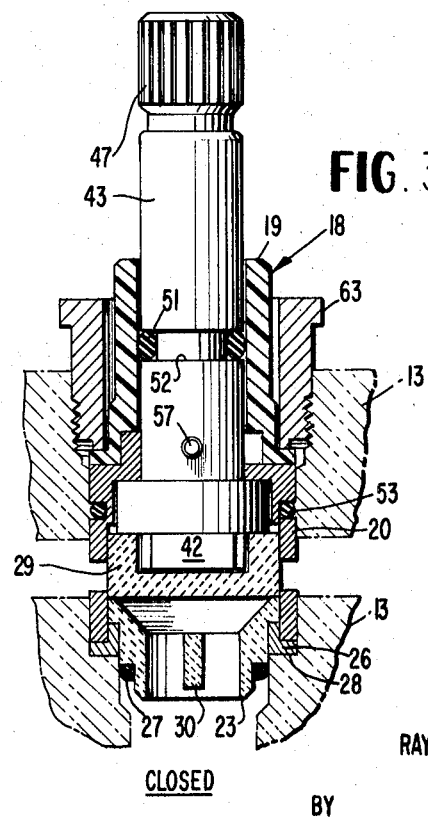
FIG. 3 is a view identical to FIG. 2 but with the operative parts of the valve turned 90° to a CLOSED position.

In FIGS. 2 and 3 there is shown a two-part valve housing 18 mounted within the faucet or valve body 13. The housing 18 consists in an upper member 19 which acts as a bushing and a lower portion 20, the upper and lower portions of the housing being held together along a surface designated 21. The lower portion 20 of the housing 18 is generally cylindrical in shape and has openings 22–22 in its sidewalls, through which liquid, may pass outwardly and thence through the element 12. A valve seat 23 having a central passageway 24 therethrough is loosely mounted in the lower portion 20 of the housing 18. An annular retainer 26 is mounted on the cylindrical periphery of the valve seat 23 and during intermediate stages of assembly can be held there by an O-ring 27 which extends slightly beyond the periphery of the valve seat 23. In the final assembly, the retainer 26 is press fitted into the lower portion 20 of the housing 18 thereby holding the valve seat 23 in the housing. The bottom surface of the annular retainer 26 in turn is supported on a shoulder 28 of the faucet body 13. The retainer in cross section is generally L-shaped, with the lower portion of the L serving as a support for the housing 18.

The retainer 26 insures that the valve remains a module or unitary structure under abnormal conditions. For example, if either the hot or cold water line is turned off downstream of its valve with the other line open, there is a substantial reduction in the force holding the valve seat 23 against the valve closure member 29. With the valve to the other line open, a force is exerted on the upper surface of the valve seat 23 urging it downwardly in the faucet body 13 and away from the valve closure member 29. The retainer 26 positively holds the valve seat 23 in the lower portion 20 of the housing 18, thereby preventing the valve seat 23 from being pushed into the lower portion of the faucet body 13. On some occasions, the prior known valve seats after being pushed into the faucet body 13, did not automatically reseat themselves when downstream water pressure was resumed, and this problem has accordingly been eliminated. It should be noted, however, that the retainer 26 does not force the valve seat 23 and valve closure member 29 together into sealing relationship, but merely limits the movement of the valve seat 23 within the lower portion 20 of the housing 18. The seal between the vaLve seat 23 and the valve closure member 29 will be discussed in greater detail hereinafter.

Figure 5:
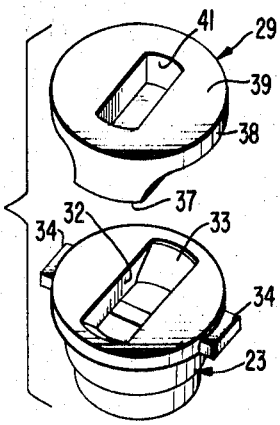
FIG. 5 is an exploded, top perspective view of the valve closure member and the valve seat.

The passageway 24 has a strainer bar 30 extending diametrically thereof. The bar is important in prohibiting particles of too large a size from becoming lodged between the valve seat 23 and a valve closure member 29. A large particle passing through passageway 24 could hold the valve open and cause damage to the smoothly finished parts of the valve. Passageway 24 is reduced at its upper end (FIG. 5) to a generally rectangular opening 32, the short sides of which are sloping as shown at 33–33. The valve seat 23 has a pair of positioning lugs 34–34 which are slidably received in complimentary notches 36–36 formed in the lower portion 20 of the housing 18 (FIG. 1). If desired, the notches 36–36 can be crimped inwardly around the positioning lugs 34–34 after assembly of the parts so as to hold the parts together as a unit for installation and removal purposes. In such case, the annular retainer 26 can be omitted.

The valve seat 23 cooperates with the valve closure member 29 mounted above the seat 23 for opening and closing the rectangular opening 32. The closure member 29 has a lower rectangular bottom 37 slightly longer and wider than the opening 32. When the member 29 is positioned as shown in FIG. 3, the opening 32 is completely closed; and when in the position shown in FIG. 2, a maximum amount of liquid is permitted to pass (see arrows). Under the effect of liquid pressure, the valve seat 23 and the closure member 29 at all times remain in contact with each other.

The valve closure member 29 flares outwardly from its rectangular bottom 37 to a circular top portion 38 having a diameter slightly less than the interior of the lower portion 20 of the housing 18, thereby providing an upper flat surface 39. The member 29 also has a central, upwardly exposed keyway 41 (FIG. 5) for receiving a key 42 formed on the lower end of a valve stem 43. The upper end of the stem 43 is splined, shown as 47, for receiving and engaging the handle 17 (FIG. 1).

In order to provide a seal between the interior of the valve housing 18 and the downstream side of the valve closure member 9, there is provided an O-ring 51 which is seated in a peripheral groove 52 in the valve stem 43. The O-ring 51 forms a sealing surface with the interior wall of the upper portion 19 of the housing 18.

The valve closure member 29 and the valve seat 23 are preferably made of a hard, wear- and corrosion-resistant material, such as a high alumina ceramic, which is capable of being polished to be extremely smooth and flat. Thus, in order to provide an effective seal between the mating surfaces of the valve seat 23 and the valve closure 29, the mating surfaces are polished to a high degree so that they slidingly cooperate to prevent the passage of liquid therebetween. This includes the upper surface of the valve seat 23 and the surface of the rectangular bottom 37 of the valve closure member 29.

It should be noted that the above identified mating surfaces are held together in sealing relationship only by the force which the liquid pressure in the inlet 11 exerts thereon. In particular, the fluid acts on the lower, exposed horizontal surfaces of the valve seat 23 to urge the seat 23 up against the valve closure member 29. That portion of the fluid which passes around the valve closure member 29 and up the wall of the valve stem 43 is precluded from exiting out of the faucet body 13 by reason of the O-ring 51. This construction eliminates any need for an additional ceramic sealing member between the valve closure unit 29 and the lower portion 20 of the housing 18. It is also unnecessary to use an additional force-applying member, such as a spring, to hold the parts in place.

It has been found that the O-ring 51 is entirely satisfactory for this purpose since the valve seat 23 and the valve closure member 29, when closed, seal off the high-pressure downstream liquid. When open, the liquid pressure is substantially reduced by liquid flowing freely from the spout of element 12, thereby placing less burden on the O-ring 51.

In order to effect fluid sealing between the lower portion 20 of the housing 18 and the faucet body 13, an additional O-ring 53 is provided in a peripheral groove 54. The O-ring 53 forms a sealing surface with the faucet body 13 so as to prevent the leakage of fluid outwardly around the housing 18. The O-ring 27 positioned around the lower portion of the valve seat 23 provides a peripheral seal between the seat 23 and the faucet body 13 at that point. Both of these O-ring seals are stationary once the valve unit is positioned within the faucet body 13, and thus are not subject to wear as the faucet is opened and closed. As will be apparent, the O-ring 27 is of particular importance in stopping flow between the valve seat 23 and the faucet body 13 so that the pressure buildup holds the valve seat 23 in firm sealing engagement with the valve closure element 29 when the valve is under operating pressure.

The upper portion 19 of the housing 18 acts as a bushing to maintain the axial alignment of valve stem 43. Preferably, this bushing portion of the housing 18 is made of a tough cellulosic plastic material such as that sold under the trademark CELCON, and is tightly fitted over the O-ring 51 to form a seal therebetween. In the past where the stem and bushing were both made of brass, an electrolytic action, commonly referred to as "dezincification," would occur causing binding between the movable members. This problem has been eliminated by making the upper portion 19 of the housing 18 of plastic which, of course, is not subject to the electrolytic action. The bushing part or upper portion 19 of the housing 18 has a lower peripheral shoulder 56 which engages against the upper surface of the lower portion 20.

Figure 4:
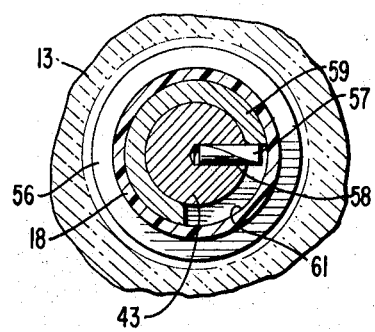
FIG. 4 is a cross-sectional view taken along line 4—4 of FIG. 2 showing the mechanism for limiting the movement of the valve stem to 90°.

The rotational movement of the valve stem 43 is limited to 90° by a pin 57 which is press fitted into a lateral passageway 58 in the stem 43 (FIG. 4). An upstanding collar 59 on the lower portion 20 of the housing 18 is provided with a cutaway section 61 equal to the desired turning angle, in this case approximately 90°. The pin 57 and its associated stem 43 can be moved from the position shown in FIG. 4 (OPEN) to the other end of the cutaway section 61 where the valve is CLOSED. Intermediate amounts of flow are obtained between these two extremes.

The faucet body 13 is interiorly threaded at 62 to receive a threaded retainer cap 63. The bottom portion of the retainer cap 63 is threaded into engagement with the shoulder 56 of the upper portion 19 of the housing 18 so as to securely hold the two portions of the housing 18 together. This further acts to urge the lower portion 20 of the housing 18 into firm contact with the annular ring 26 which is seated on the shoulder 28. Removal of the retainer cap 63 permits the entire valve housing 18 and the parts held therein to be withdrawn from the faucet body 13 as a unit by merely grasping and pulling upward on the valve stem 43, or the handle 17.

It is to be understood that the above-described arrangement of apparatus and construction of elemental parts are simply illustrative of an application of the principles of the invention and that many other modifications and variations may be made without departing from the invention.

I claim:

1. A faucet valve of the type which includes, a generally cylindrical housing to be mounted inside a valve body having a liquid inlet and outlet, said housing having at least one opening in the wall thereof through which liquid can flow into the outlet; a valve seat loosely mounted in the bottom inlet end of the housing, said seat having a central passageway communicating with the liquid inlet; a valve closure member rotatably mounted on the valve seat and movable from a first position wherein the passageway is totally closed to a second position wherein the passageway has a maximum opening which communicates with the housing opening; said valve seat and valve closure member having smoothly polished mating surfaces so that liquid pressure acting on the inlet side of the valve seat is sufficient alone to provide a seal therebetween when the valve is in the closed position; seal means between the downstream side of the valve closure member and said housing; manually operable means connected to said valve closure member for moving the member between its first and second positions, wherein the improvement comprises an annular retainer having a generally L-shaped cross section, one leg of said L-shaped cross section extending upwardly and being press fitted within the lower cylindrical end of said housing, the upper end of said one leg engaging said valve seat to retain said valve seat and said valve closure member within said housing, the other leg of said L-shaped cross section extending radially outwardly beneath the lower end of said housing to support said housing and the components therein when said housing is mounted inside the valve body.

2. A faucet valve of the type which includes, a valve body having a liquid inlet and outlet; a housing mounted inside the body and having at least one opening in the wall thereof through which liquid can flow into the outlet; a retainer cap engaged with said valve body to retain said housing inside the body; a valve seat loosely mounted in the bottom inlet end of the housing, said seat having a central passageway communicating with the liquid inlet; a valve closure member rotatably mounted on the valve seat and movable from a first position wherein the passageway is totally closed to a second position wherein the passageway has a maximum opening which communicates with the housing opening; said valve seat and valve closure member having smoothly polished mating surfaces so that liquid pressure acting on the inlet side of the valve seat is sufficient alone to provide a seal therebetween when the valve is in the closed position; and manually operable means including a valve stem connected to said valve closure member for moving the member between its first and second positions, wherein the improvement comprises:

said housing having a lower portion and an upper portion made of plastic provided with a cylindrical bore to act as a bushing for said valve stem, the lower end of said upper portion terminating in a radially outwardly extending flange engaging the upper end of said lower portion, said flange being disposed to be pressed down on said lower portion by said retainer cap when said housing is mounted inside said valve body; and an O-ring mounted on said valve stem in engagement with said cylindrical bore for providing a seal between the downstream side of the valve closure member and said housing.

3. A faucet valve as recited in claim 2 which further includes: an annular retainer having a generally L-shaped cross section, one leg of said L-shaped cross section extending upwardly and being press fitted within the lower cylindrical end of said housing, the upper end of said one leg engaging said valve seat to retain said valve seat and said valve closure member within said housing, the other leg of said L-shaped cross section extending radially outwardly beneath the lower end of said housing to support said housing and the components therein when said housing is mounted inside the valve body.